(12) United States Patent
Yamaura

(10) Patent No.: US 9,331,762 B2
(45) Date of Patent: *May 3, 2016

(54) WIRELESS COMMUNICATION SYSTEM, WIRELESS COMMUNICATION APPARATUS, AND WIRELESS COMMUNICATION METHOD

(71) Applicant: Sony Corporation, Tokyo (JP)

(72) Inventor: Tomoya Yamaura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/284,841

(22) Filed: May 22, 2014

(65) Prior Publication Data

US 2014/0254578 A1    Sep. 11, 2014

Related U.S. Application Data

(60) Continuation of application No. 13/958,484, filed on Aug. 2, 2013, now Pat. No. 8,768,247, which is a continuation of application No. 13/541,294, filed on Jul. 3, 2012, now Pat. No. 8,532,569, which is a division of application No. 11/913,165, filed as application No. PCT/JP2007/059135 on Apr. 20, 2007, now Pat. No. 8,260,198.

(30) Foreign Application Priority Data

Apr. 27, 2006  (JP) ................................. 2006-124536
Mar. 6, 2007   (JP) ................................. 2007-056244

(51) Int. Cl.
*H04B 1/00*        (2006.01)
*H04B 7/00*        (2006.01)

(Continued)

(52) U.S. Cl.
CPC ............ *H04B 7/0473* (2013.01); *H04B 7/0417* (2013.01); *H04B 7/0421* (2013.01); *H04B 7/0626* (2013.01); *H04B 7/0628* (2013.01); *H04B 7/0862* (2013.01); *H04W 84/12* (2013.01)

(58) Field of Classification Search
CPC .... H04B 7/0421; H04B 7/0473; H04B 7/061; H04B 7/0619; H04B 7/626; H04B 7/0697; H04B 7/0862
USPC ...................... 455/39, 69, 101; 375/267, 299; 370/328, 336, 338, 342–345
See application file for complete search history.

(56) References Cited

U.S. PATENT DOCUMENTS 6,418,175 B1   7/2002   Pukkila et al.
6,687,492 B1   2/2004   Sugar et al.

(Continued)

FOREIGN PATENT DOCUMENTS

EP    1 598 955 A2    11/2005
EP    2 011 250 A     11/2007

(Continued)

OTHER PUBLICATIONS

[No Author Listed] http://radio3.ee.uec.ac.jp/MIMO(IEICE.sub.--TS).pdf. Oct. 24, 2003;:32-5.

(Continued)

*Primary Examiner* — Simon Nguyen
(74) *Attorney, Agent, or Firm* — Wolf, Greenfield & Sacks, P.C.

(57) ABSTRACT

A wireless communication system is disclosed. The wireless communication system performs data transmission using spatially multiplexed streams from a first terminal including N antennas to a second terminal including M antennas (N and M are integers larger than or equal to 2 and N>M).

14 Claims, 10 Drawing Sheets

(51) Int. Cl.
*H04B 7/02* (2006.01)
*H04B 7/04* (2006.01)
*H04B 7/06* (2006.01)
*H04W 84/12* (2009.01)
*H04B 7/08* (2006.01)

(56) References Cited

U.S. PATENT DOCUMENTS

| | | | |
|---|---|---|---|
| 6,859,503 B2 | 2/2005 | Pautler et al. | |
| 7,068,628 B2 | 6/2006 | Li et al. | |
| 7,099,678 B2 | 8/2006 | Vaidyanathan | |
| 7,110,378 B2 | 9/2006 | Onggosanusi et al. | |
| 7,248,645 B2 | 7/2007 | Vialle et al. | |
| 7,272,162 B2 * | 9/2007 | Sano et al. | 375/135 |
| 7,295,542 B2 | 11/2007 | Xu | |
| 7,433,416 B1 | 10/2008 | Banister | |
| 7,486,720 B2 | 2/2009 | Molisch et al. | |
| 7,508,880 B2 * | 3/2009 | Yun et al. | 375/267 |
| 7,570,696 B2 * | 8/2009 | Maltsev et al. | 375/260 |
| 7,636,573 B2 | 12/2009 | Walton et al. | |
| 7,706,324 B2 | 4/2010 | Sutivong et al. | |
| 7,746,943 B2 | 6/2010 | Yamaura | |
| 7,756,210 B2 | 7/2010 | Castelain et al. | |
| 7,773,685 B2 | 8/2010 | Tirkkonen et al. | |
| 7,848,444 B2 | 12/2010 | Yamaura | |
| 7,949,060 B2 | 5/2011 | Ling et al. | |
| 8,194,720 B2 | 6/2012 | Yamaura | |
| 8,243,749 B2 | 8/2012 | Basson et al. | |
| 8,260,198 B2 * | 9/2012 | Yamaura | 455/39 |
| 8,345,732 B2 | 1/2013 | Fischer et al. | |
| 8,369,790 B2 | 2/2013 | Li et al. | |
| 8,374,096 B2 | 2/2013 | Gu et al. | |
| 8,532,569 B2 | 9/2013 | Yamaura | |
| 8,699,477 B2 | 4/2014 | Yamaura | |
| RE45,150 E | 9/2014 | Yamaura | |
| 8,830,846 B2 * | 9/2014 | Grandhi et al. | 370/252 |
| 8,964,521 B2 * | 2/2015 | Hansen et al. | 370/203 |
| 2003/0003880 A1 | 1/2003 | Ling et al. | |
| 2004/0178954 A1 | 9/2004 | Vook et al. | |
| 2004/0192218 A1 | 9/2004 | Oprea | |
| 2004/0199056 A1 | 10/2004 | Husemann et al. | |
| 2005/0043031 A1 | 2/2005 | Cho et al. | |
| 2005/0053170 A1 | 3/2005 | Catreux et al. | |
| 2005/0090205 A1 | 4/2005 | Catreux-Erceg et al. | |
| 2005/0213682 A1 | 9/2005 | Han et al. | |
| 2006/0039328 A1 | 2/2006 | Ihm et al. | |
| 2006/0056316 A1 | 3/2006 | Chandra et al. | |
| 2006/0067718 A1 | 3/2006 | Toda et al. | |
| 2006/0068718 A1 | 3/2006 | Li et al. | |
| 2006/0068738 A1 | 3/2006 | Li et al. | |
| 2006/0121946 A1 | 6/2006 | Walton et al. | |
| 2006/0172707 A1 | 8/2006 | Stern-Berkowitz et al. | |
| 2006/0250963 A1 | 11/2006 | Jin et al. | |
| 2006/0270343 A1 * | 11/2006 | Cha et al. | 455/25 |
| 2006/0291544 A1 * | 12/2006 | Fischer et al. | 375/219 |
| 2006/0291581 A1 | 12/2006 | Onggosanusi et al. | |
| 2007/0111666 A1 | 5/2007 | Waxman | |
| 2007/0160010 A1 | 7/2007 | Maltsev et al. | |
| 2007/0160162 A1 | 7/2007 | Kim et al. | |
| 2007/0189412 A1 | 8/2007 | Xia et al. | |
| 2007/0191066 A1 | 8/2007 | Khojastepour et al. | |
| 2007/0201566 A1 | 8/2007 | Solomon et al. | |
| 2007/0201575 A1 | 8/2007 | Ariyavisitakul et al. | |
| 2007/0253501 A1 | 11/2007 | Yamaura | |
| 2007/0258541 A1 | 11/2007 | Yamaura | |
| 2008/0108310 A1 | 5/2008 | Tong et al. | |
| 2008/0113626 A1 | 5/2008 | Kim et al. | |
| 2008/0212538 A1 * | 9/2008 | Molisch | 370/334 |
| 2008/0261551 A1 | 10/2008 | Catreux-Erceg et al. | |
| 2009/0161641 A1 | 6/2009 | Kim | |
| 2009/0207765 A1 | 8/2009 | Yamaura | |
| 2009/0290563 A1 * | 11/2009 | Gu et al. | 370/338 |
| 2011/0075606 A1 | 3/2011 | Yamaura | |
| 2011/0310996 A1 | 12/2011 | Raleigh et al. | |
| 2012/0213300 A1 | 8/2012 | Yamaura | |
| 2012/0269158 A1 | 10/2012 | Yamaura | |
| 2012/0281631 A1 | 11/2012 | Yamaura | |
| 2013/0129000 A1 * | 5/2013 | Fischer et al. | 375/267 |
| 2013/0315177 A1 | 11/2013 | Yamaura et al. | |
| 2013/0315222 A1 | 11/2013 | Yamaura et al. | |
| 2013/0315330 A1 | 11/2013 | Yamaura et al. | |
| 2013/0315331 A1 | 11/2013 | Yamaura et al. | |
| 2013/0315332 A1 | 11/2013 | Yamaura et al. | |
| 2013/0315333 A1 | 11/2013 | Yamaura et al. | |
| 2013/0315334 A1 | 11/2013 | Yamaura et al. | |
| 2013/0315335 A1 | 11/2013 | Yamaura et al. | |
| 2013/0322379 A1 | 12/2013 | Yamaura et al. | |
| 2013/0343369 A1 | 12/2013 | Yamaura et al. | |
| 2014/0219378 A1 | 8/2014 | Yamaura | |
| 2014/0219385 A1 | 8/2014 | Yamaura | |

FOREIGN PATENT DOCUMENTS

| | | |
|---|---|---|
| JP | 2002-44051 | 2/2002 |
| JP | 2004-23716 | 1/2004 |
| JP | 2007-318727 | 12/2007 |
| JP | 2007-318728 | 12/2007 |
| JP | 2007-318729 | 12/2007 |
| JP | 4356756 | 8/2009 |
| JP | 4775288 | 7/2011 |
| WO | 2005/125044 A1 | 12/2005 |
| WO | WO 2006/129958 A1 | 12/2006 |
| WO | WO 2007/126036 A1 | 11/2007 |

OTHER PUBLICATIONS

Benjebbour et al., Comparison of Ordered Successive Receivers for Space-Time Transmission. Proc IEEE VTC. 2001;4:2053-7.

Benjebbour et al., Performance of Iterative Successive Detection Algorithm for Space-Time Transmission. Proc IEEE VTC. May 2001;2:1287-91.

Benko et al., A PHY/MAC Proposal for IEEE 802.22 WRAN Systems. Feb. 23, 2006. Doc. No. IEE 802.22-06/0005r3.

Ohwatari et al., A Study on Reduction of the Amount of Channel State Information Feedback in MIMO-OFDM Eigenbeam-Space Division Multiplexing Systems. IEICE Technical Report RCS2006-7. 2006;:1-14.

Tomcik, QFDD and QTDD: Technology Overview. IEEE 802.20 Working Group on Mobile Broadband Wireless Access. Oct. 28, 2005. Doc No. IEE C802.20-05/68.

Chinese Office Action and English translation thereof dated Oct. 10, 2014 in connection with Application No. 201210206360.8.

Chinese Office Action and English translation thereof dated Apr. 7, 2015 in connection with Chinese Application No. 2012102063608.

U.S. Appl. No. 60/780,623, filed Mar. 9, 2006, Chandra et al.

Stephens et al., Joint Proposal: High Throughput Extension to the 802.11 Standard: MAC, IEEE 802.11-05/1095r4, Jan. 13, 2006, pp. 1-103.

Xia et al. Analysis of Transmit Beamfonning in IEEE 802.11 in Systems, IEEE Global Telecommunications Conference, 2006, pp. 1-5.

No Author Listed, IEEE P802.11n™/D1.0, Draft Amendment to Standard [for] Information Technology—Telecommunications and information exchange between systems—Local and Metropolitan networks—Specific requirements—Part 11: Wireless LAN Medium Access Control (MAC) and Physical Layer (PHY) specifications: Enhancements for Higher Throughput, IEEE Draft; P802, vol. 802, 11n, No. D1.0, Mar. 9, 2006, pp. 1-335.

* cited by examiner

FIG. 4

| OCTET | 1 | 1 | 2 | 1 | 16 | 1 | 4 | 1 |
|---|---|---|---|---|---|---|---|---|
| | ELEMENT ID | LENGTH (25) | HT CAPABILITIES INFO | MAC HT PARAMETERS INFO | SUPPORTED MCS SET | EXTENDED HT CAPABILITY INFO | TxBF CAPABILITIES | AS CAPABILITIES |

FIG. 5

| B0 | B1 | B2 | B3 | B4 | B5 | B6-B7 | B8 | B9 |
|---|---|---|---|---|---|---|---|---|
| TxBF CAPABLE | RECEIVE STAGGERED SOUNDING CAPABLE | TRANSMIT STAGGERED SOUNDING CAPABLE | RECEIVE ZLF CAPABLE | TRANSMIT ZLF CAPABLE | IMPLICIT TxBF CAPABLE | CALIBRATION | EXPLICIT CSI TxBF CAPABLE | EXPLICIT UNCOMPRESSED STEERING MATRIX CAPABLE |

| B10-B12 | B13-B15 | B16-B18 | B19-B20 | B21-B22 | B23-B24 | B25-B31 |
|---|---|---|---|---|---|---|
| EXPLICIT BF CSI FEEDBACK | EXPLICIT UNCOMPRESSED STEERING MATRIX FEEDBACK | EXPLICIT COMPRESSED STEERING MATRIX FEEDBACK | CSI NUMBER OF BEAMFORMER ANTENNAE | UNCOMPRESSED STEERING MATRIX OF BEAMFORMER ANTENNAE | COMPRESSED STEERING MATRIX OF BEAMFORMER ANTENNAE | RESERVED |

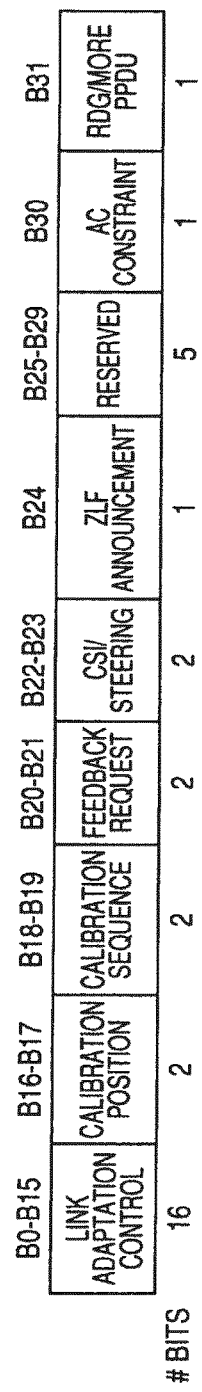

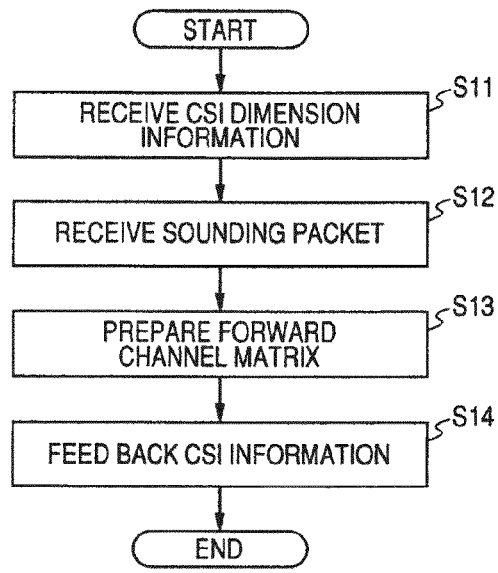
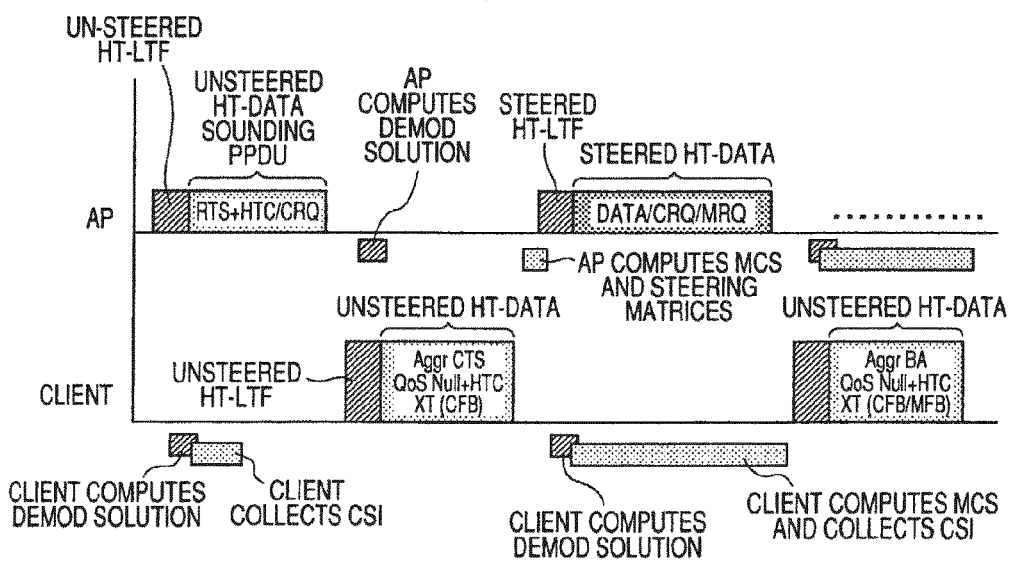

WIRELESS COMMUNICATION SYSTEM, WIRELESS COMMUNICATION APPARATUS, AND WIRELESS COMMUNICATION METHOD

CROSS REFERENCES TO RELATED APPLICATIONS

This application is a continuation of and claims the benefit under 35 U.S.C. §120 of U.S. patent application Ser. No. 13/958,484, titled "WIRELESS COMMUNICATION SYSTEM, WIRELESS COMMUNICATION APPARATUS, AND WIRELESS COMMUNICATION METHOD," filed on Aug. 2, 2013, which is a continuation of and claims the benefit under 35 U.S.C. §120 of U.S. patent application Ser. No. 13/541,294, filed on Jul. 3, 2012, which is a divisional of and claims the benefit under 35 U.S.C. §120 of U.S. patent application Ser. No. 11/913,165, filed on Apr. 24, 2009, which is a national stage of International Application No. PCT/JP2007/059135, filed on Apr. 20, 2007, which claims the benefit under 35 U.S.C. §119 of Japanese Patent Application JP 2007-056244, filed on Mar. 6, 2007, and Japanese Patent Application JP 2006-124536, filed on Apr. 27, 2006. The entire contents of these applications are hereby incorporated by reference in their entireties.

TECHNICAL FIELD

In one aspect, the invention relates to a wireless communication system, a wireless communication apparatus, and a wireless communication method using spatial multiplexing. More particularly, the invention relates to a wireless communication system, a wireless communication apparatus, and a wireless communication method, in which a transmitter and a receiver share channel information to perform closed loop type spatial multiplexing transmission.

In another aspect, the invention relates to a wireless communication system, a wireless communication apparatus, and a wireless communication method, which perform beamforming by obtaining a channel matrix on the basis of a training sequence transmitted from a receiver when a transmitter transmits a packet. More particularly, the invention relates to a wireless communication system, a wireless communication apparatus, and a wireless communication method, which perform beamforming using the training sequence transmitted from the transmitter to the receiver when the number of antennas of the transmitter, which is a beamformer, is smaller than that of the receiver, which is a beamformee.

BACKGROUND ART

Wireless network has attracted much attention recently, because it is capable of removing wire in an existing wired communication network. Standard wireless networks include IEEE (Institute of Electrical and Electronics Engineers) 802.11 or IEEE 802.15.

For example, IEEE 802.11a/g, a standard of wireless Local Area Network (LAN), specifies an orthogonal frequency division multiplexing (OFDM) modulation method, which is a multi-carrier method. Because, in the OFDM modulation method, transmission data having orthogonal frequencies is distributed to a plurality of carriers and transmitted, the band of each carrier becomes narrow, spectrum efficiency is very high, and resistance to frequency-selective fading interference is strong.

In addition, IEEE 802.11a/g standard supports a modulation method for accomplishing a communication speed up to 54 Mbps. However, a next-generation wireless LAN standard requires a higher bit rate.

In order to realize a higher speed for wireless communications, multi-input multi-output (MIMO) communication has attracted attention. MIMO communication employs a plurality of antennas in a transmitter and in a receiver to realize spatially multiplexed streams. The transmitter performs spatial/temporal encoding and multiplexing of plural pieces of transmission data, and distributes and transmits the plural pieces of transmission data to N transmission antennas through channels, where N is a positive integer. The receiver performs spatial/temporal decoding on signals received by M reception antennas through the channels to obtain reception data without crosstalk between the streams (see, for example, JP-A-2002-44051, hereinafter referred to as Patent Document 1), where M is a positive integer. Ideally, spatial streams are formed corresponding to a fewer number of transmission and reception antennas (i.e., MIN[N,M]).

According to MIMO communication, a transmission capacity can be increased according to the number of antennas, and a communication speed can be improved without increasing frequency bands. Because spatial multiplexing is used, spectrum efficiency is high. MIMO communication uses channel characteristics and is different from a simple transmission/reception adaptive array. For example, IEEE 802.11n, which is a standard extended from IEEE 802.11a/g, specifies an OFDM_MIMO method using OFDM as the primary modulation. Currently, IEEE 802.11n is standardized in Task Group n (TGn), in which a specification is established based on a specification established in Enhanced Wireless Consortium (EWC) formed in October, 2005.

In MIMO communication, in order to spatially divide a spatially multiplexed reception signal y into stream signals x, a channel matrix H is acquired by any method and spatially multiplexed reception signal y needs to be spatially divided into a plurality of original streams using channel matrix H by a predetermined algorithm.

Channel matrix H is obtained by allowing a transmitter/receiver to transmit/receive existing training sequence, estimating the channels by a difference between the actually received signal and the existing sequence, and arranging propagation channels in a matrix form according to a combination of transmission and reception antennas. When there are N transmission antennas and M reception antennas, the channel matrix is an M×N (row times column) matrix. Accordingly, the transmitter transmits N training sequence and the receiver acquires channel matrix H using the received training sequence.

A method for spatially dividing a reception signal is generally classified into an open loop type method, in which a receiver independently performs spatial division on the basis of channel matrix H, and a closed loop type method, in which a transmitter gives weight to transmission antenna on the basis of channel matrix H to perform adequate beamforming toward a receiver to form an ideal spatial orthogonal channel.

For an open loop type MIMO transmission method, there is a zero force (see, for example, A. Benjebbour, H. Murata, and S. Yoshida, "Performance of iterative successive detection algorithm for space-time transmission," Proc. IEEE VTC Spring, vol. 2, pp. 1287-1291, Rhodes, Greece, May 2001, hereinafter referred to as Non-Patent Document 1), or a minimum mean square error (MMSE) (see, for example, A. Benjebbour, H. Murata, and S. Yoshida, "Performance comparison of ordered successive receivers for space-time transmission," Proc. IEEE VTC Fall, vol. 4, pp. 2053-2057, Atlantic City, USA, September 2001, hereinafter referred to as Non-Patent Document 2). The open loop type MIMO transmission method is a relatively simple algorithm for obtaining reception weight matrix W for spatially dividing the reception signal from channel matrix H, in which a feedback operation for sharing the channel information between the transmitter and the receiver is omitted, and the transmitter and the receiver independently perform spatial multiplexing transmission.

For an ideal closed loop type MIMO transmission method, a singular value decomposition (SVD)-MIMO method using SVD of channel matrix H is known (see, for example, http://radio3.ee.uec.ac.jp/MIMO(IEICE_TS).pdf (Oct. 24, 2003), hereinafter referred to as Non-Patent Document 3). In the SVD-MIMO transmission, a numerical matrix having channel information that uses antenna pairs as elements, that is, a channel information matrix H, is subjected to the singular value decomposition to obtain $UDV^H$. A transmitter uses V in a transmission antenna weight matrix, and transmits a beamformed packet to a receiver. A receiver typically uses $(UD)^{-1}$ as a reception antenna weight matrix. Here, D is a diagonal matrix having square roots of singular values $\lambda_i$ corresponding to qualities of the spatial streams in diagonal elements (the subscript "i" indicates the i-th spatial stream). Singular values $\lambda_i$ are the diagonal elements of diagonal matrix D in ascending order. Power ratio distribution or modulation method allocation is performed according to communication quality represented by the level of singular value with respect to the streams, such that a plurality of spatial orthogonal multiplexed propagation channels, which are logically independent, are realized. The receiver can extract a plurality of original signal sequence without crosstalk, and theoretically accomplish maximum performance.

In the closed loop type MIMO communication system, adequate beamforming is performed when the transmitter transmits a packet, but information on the channel information needs to be fed back from the receiver for receiving the packet.

For example, EWC HT (High Throughput) MAC (Media Access Control) Specification, Version V1.24, defines two kinds of procedures, "implicit feedback" and "explicit feedback," as the procedures for feeding back the information on the channel matrix between the transmitter and the receiver.

For "implicit feedback," the transmitter estimates a backward channel matrix transmitted from the receiver using a training sequence also transmitted from the receiver. A forward channel matrix transmitted from the transmitter to the receiver is computed to perform beamforming under the assumption that bi-directional channel characteristics between the transmitter and the receiver are reciprocal. Calibration of an RF circuit in a communication system is performed, such that the channel characteristics are reciprocal.

For "explicit feedback," the receiver estimates a forward channel matrix transmitted from the transmitter using a training sequence also transmitted from the transmitter, and returns a packet including the channel matrix as data to the transmitter. The transmitter performs the beamforming using the received channel matrix. Alternatively, the receiver computes a transmission weight matrix for allowing the transmitter to perform the beamforming from the estimated channel matrix, and returns a packet including the transmission weight matrix as data to the transmitter. For explicit feedback, because the weight matrix is computed on the basis of the estimated forward channel matrix, it may not be assumed that the channels are reciprocal.

In view of packet transmission, the transmitter is an initiator and the receiver is a terminator. However, in view of beamforming, the initiator for transmitting the packet is a beamformer and the terminator for receiving the beamformed packet is a beamformee. Communication from the beamformer to the beamformee is referred to as "forward," and communication from the beamformee to the beamformer is referred to as "backward." For example, when an access point (AP) transmits a data frame to a client terminal (STA) as the beamformer, explicit feedback requires that the access point performs beamforming on the basis of channel information transmitted from the client terminal.

For explicit feedback, the beamformer can receive explicit feedback of the estimation channel matrix from the beamformee. The feedback format of the estimation channel matrix can generally be classified into two different cases. In one case, a MIMO channel coefficient is sent; while in another case, a transmission weight matrix V for beamforming is computed by the beamformee. The former format is called channel state information (CSI). The beamformer needs to compute the transmission weight matrix V for beamforming by constructing the channel matrix H from received CSI, thereby performing the singular value decomposition. The latter is further classified into a case where transmission weight matrix V for beamforming is sent in an uncompressed format, and a case where transmission weight matrix V for beamforming is sent in a compressed format. According to the explicit feedback, a processing burden for estimating the channel matrix in the beamformer and a processing burden for calculating the transmission weight matrix from the channel matrix are reduced.

FIG. 12 shows a frame exchange procedure for transmitting beamforming from the access point to the client terminal by explicit feedback.

This procedure is initiated by the access point which sends a sounding packet including a CSI feedback request.

The sounding packet includes the training sequence excited by the channel matrix. Accordingly, when the sounding packet is received, the client terminal divides the spatial stream training to estimate channel matrix H and collects the CSI. CSI data is included in the packet as a CSI feedback (CFB), and returned to the access point.

The access point computes the transmission weight matrix for beamforming from received CFB, and multiplies the transmission signal by the transmission weight matrix for beamforming to transmit the beamformed packet to the client terminal. By beamforming, even if the client terminal is located at a place where wireless communication was difficult in the past, the client terminal may still perform wireless communication at a high transmission rate.

Subsequently, an operation for performing beamforming according to explicit feedback will be described with reference to FIG. 13. In FIG. 13, a first client terminal STA-A having three antennas is a beamformer, a second client terminal STA-B having two antennas is the beamformee. Feedback is performed based on the CSI format. In the following description or equations, a subscript AB indicates forward transmission from STA-A to STA-B. A numerical subscript corresponds to antenna number of the corresponding client terminal.

The training sequence transmitted from the antennas of STA-A is $(t_{AB1}, t_{AB2}, t_{AB3})$ and the signals received by the antennas of STA-A through a channel $H_{AB}$ are $(r_{AB1}, r_{AB2})$. The following equation is obtained.

$$\begin{pmatrix} r_{AB1} \\ r_{AB2} \end{pmatrix} = H_{AB} \begin{pmatrix} t_{AB1} \\ t_{AB2} \\ t_{AB3} \end{pmatrix} \quad (1)$$

where, channel matrix $H_{AB}$ is a 2×3 matrix expressed by equation (2). Here, $h_{ij}$ is a channel characteristics value of the j-th antenna of STA-A to the i-th antenna of STA-B.

$$H_{AB} = \begin{pmatrix} h_{11} & h_{12} & h_{13} \\ h_{21} & h_{22} & h_{23} \end{pmatrix} \quad (2)$$

When channel matrix $H_{AB}$ is subjected to singular value decomposition, equation (3) is obtained. Here, $U_{AB}$ is a matrix having an inherent normalized vector of $H_{AB}H_{AB}^H$, $V_{AB}$ is an inherent normalized vector of $H_{AB}^H H_{AB}$, and $D_{AB}$ is a diagonal matrix having a square root of an inherent vector of $H_{AB}H_{AB}^H$ or $H_{AB}^H H_{AB}$ as the diagonal elements. In addition, $U_{AB}$ and $V_{AB}$ are unitary matrices, namely complex conjugates of transposed matrices become the inverse of the matrices.

$$H_{AB} = U_{AB} D_{AB} V_{AB}^H \quad (3)$$

The transmission weight matrix necessary for forming the frame transmitted from STA-A to STA-B is matrix $V_{AB}$ obtained by performing the singular value decomposition with respect to forward channel matrix $H_{AB}$. When the beamformee receives a sounding packet, the beamformee divides the sounding packet into spatial stream trainings to construct estimation channel matrix $H_{AB}$. The CSI composed of MIMO channel coefficients $h_{11}$, $H_{12}$, etc., which are elements of the channel matrix is collected and fed back to STA-A.

If a transmission vector composed of transmission signals of the antennas of STA-A is x, and a reception signal of STA-B is y, the reception signal becomes $y = H_{AB}x$ in a case where the beamforming is not performed (un-steered), but reception signal y becomes equation (4) in a case where the beamforming are performed by transmission weight matrix $V_{AB}$ (steered).

$$\begin{aligned} y &= H_{AB} V_{AB} x \\ &= (U_{AB} D_{AB} V_{AB}^H) \cdot V_{AB} x \\ &= U_{AB} D_{AB} x \end{aligned} \quad (4)$$

Accordingly, STA-B can perform spatial division to the original stream by multiplying a reception vector including the reception signals of the antennas by $D_{AB}^{-1} U_{AB}^H$ as a reception weight.

When beamforming according to the explicit feedback is performed with the CSI format, there is a reduced burden on a process of estimating the channel matrix in the beamformer. However, the terminal, which is the beamformer, computes the transmission weight matrix for beamforming by performing the singular value decomposition, or other calculation methods, with respect to the channel matrix fed back from the beamformee. This is a heavily loaded calculation and the load increases depending on the dimension of the channel matrix.

In an example shown in FIG. 13, STA-A includes three antennas (N=3), and STA-B includes two antennas (M=2). Because there are more antennas in STA-A than in STA-B, no problem is caused in the processing capability for beamforming. This is because STA-A is designed to include the processing capability corresponding to N of its own streams; and an N×M channel matrix is constructed on the basis of the CSI fed back from the beamformee to perform computation of the matrix for beamforming on the basis of the channel matrix.

However, for N<M, that is, the number of antennas of the beamformee is larger than that of the beamformer, problems may be caused because the beamformer does not include the processing capability which exceeds the number of its own spatial streams. When STA-A can process only N streams, which is equal to the number of antennas, the matrix for beamforming may not be obtained from the N×M estimation channel matrix.

In order to solve such a problem without deteriorating the beamforming characteristics, it may be considered that a channel estimation maximum dimension $M_{max}$ corresponding to a rated maximum number of antennas is given to STA-A as the beamformee (for example, if it is based on the IEEE specification, $M_{max}=4$ and a processing capability for computing the transmission weight matrix for beamforming is given to the obtained $M_{max} \times N$ estimation channel matrix.

For example, when STA-A includes two antennas (i.e. N 2) and the rated maximum number of antennas is $M_{max}=4$, STA-A can compute only a 2×2 matrix for communication with the terminal having the same number of antennas, but must compute a 4×2 matrix. In this case, calculation or processing circuit needs to be doubled, which renders it difficult to reduce the size and the cost of the communication apparatus.

DISCLOSURE OF INVENTION

There are provided a wireless communication system, a wireless communication apparatus, and a wireless communication method, which are capable of performing communication at a high transmission rate by a beamformed packet by allowing a terminal, which is operated as a beamformer, to obtain a transmission weight matrix on the basis of an estimation channel matrix fed back from a terminal, which is operated as a beamformee.

There are also provided a wireless communication system, a wireless communication apparatus, and a wireless communication method, which are capable of performing beamforming by explicit feedback without deteriorating beamforming characteristics, nor increasing a processing capability of channel estimation or a computing capability of a matrix for beamforming in the beamformer, even when the number of antennas of a terminal, which is a beamformer, is smaller than that of a beamformee.

According to a first embodiment, there is provided a wireless communication system for transmitting spatially multiplexed streams from a first terminal including N antennas to a second terminal including M antennas (N is an integer of 2 or more and M is an integer of 1 or more), the system including: notifying means for notifying the second terminal of a maximum dimension $M_{max}$ at the time of computing a transmission weight matrix for beamforming of the first terminal ($M_{max}$ is an integer of N or less); training means for transmitting a packet including training sequence corresponding to the number N of antennas of the first terminal and the number M of antennas of the second terminal from the first terminal to the second terminal; channel matrix estimation means for dividing the training sequence received by the antennas of the second terminal into M streams, and estimating a channel matrix; channel information feedback means for suppressing a dimension number of the channel matrix estimated by the second terminal to $M_{max}$ or less rows and N columns, and feeding back the suppressed channel matrix to the first terminal in consideration of the maximum dimension $M_{max}$ at the time of computing the transmission weight matrix for beamforming in the first terminal, in a case of N<M; transmission weight matrix computation means for obtaining the transmission weight matrix for beamforming at the time of transmitting data from the first terminal to the second terminal using the channel matrix having $M_{max}$ or less rows and N columns fed back from the second terminal to the first terminal; and beamforming means for performing beamforming in transmission signals of the antennas of the first terminal using the transmission weight matrix for beamforming when a data packet is transmitted from the first terminal to the second terminal.

The term "system" described herein indicates a logical set of apparatuses (or function modules for realizing specific functions). It is appreciated that the apparatuses or the function modules are not necessarily included in a single housing. The same is true in the following descriptions.

In order to realize high speed wireless communication, there is provided a MIMO communication method, which employs a plurality of antenna elements in a transmitter and a receiver, thereby communicating via spatially multiplexed streams. In particular, in a closed loop type MIMO communication system, a terminal that transmits a data packet performs beamforming on the basis of feedback of information on an estimation channel matrix from a receiving terminal, such that a plurality of spatial orthogonal multiplexed propagation channels, which are logically independent, are realized, and the receiving terminal can extract a plurality of original signal sequence without crosstalk, thereby theoretically accomplishing a maximum performance.

In order to perform feedback of the channel matrix from the receiving terminal to the transmitting terminal, for example, two kinds of procedures, that is, "implicit feedback" and "explicit feedback," are defined in the EWC HT MAC specification. Among them, in the explicit feedback, the first terminal, which is operated as a beamformer, performs beamforming of a transmission packet using the transmission weight matrix for beamforming based on the channel information fed back from the second terminal, which is operated as a beamformee.

When the beamforming according to the explicit feedback is performed with the CSI format, there is a reduced burden on estimating the channel matrix in the beamformer.

However, for N<M, that is, the number of antennas of the beamformee is larger than that of the beamformer, problems may arise, because the beamformer does not include the processing capability, which exceeds the number of its own spatial streams. When terminal STA-A can process only N streams, which is equal to the number of antennas, the matrix for beamforming may not be obtained from the M×N estimation channel matrix.

In the wireless communication system according to a first embodiment, when beamforming is performed according to the explicit feedback, the maximum dimension $M_{max}$ for computing the transmission weight matrix for beamforming of the first terminal is pre-notified to the second terminal, and the second terminal transmits the packet including the training sequence for exciting the $M_{max} \times N$ forward channel matrix in correspondence with the maximum dimension $M_{max}$ of the matrix operation of the first terminal and the number N of antennas of the first terminal. In other words, the second terminal suppresses the dimension of the estimation matrix to be less than or equal to the maximum dimension $M_{max}$ of the matrix operation of the first terminal, and returns the CSI information. Accordingly, the first terminal can obtain the transmission weight matrix for beamforming in a range of the processing capability corresponding to the number of its own antennas.

Accordingly, in one embodiment, when a closed loop type MIMO communication is performed by the explicit feedback, the channel estimation, in which the dimension number is suppressed according to the number of antennas of the beamformer, is fed back from the beamformee. Thus, the first terminal, which is operated as the beamformer, can perform the computation of the transmission weight matrix for beamforming, in which the dimension number is suppressed, thereby reducing the circuit size of the first terminal.

In more detail, compared with a case where an M×N channel matrix is fed back, the circuit size of a buffer part for receiving the CSI information can be reduced to an order of $(N/M)^2$. In addition, because the transmission weight matrix for beamforming is computed from an N×N channel matrix, the circuit size of the beamforming transmission weight matrix computation unit can be reduced to an order of $(N/M)^2$, compared with the case where the transmission weight matrix is computed from the M×N channel matrix. Due to the reduction of circuit size, it is possible to reduce power consumption of the apparatus.

Because the CSI information fed back in the channel is reduced from M×N to N×N, overhead is reduced, thereby improving the overall throughput of the system.

Due to the reduction of circuit size and the reduction of channel overhead, it is possible to reduce delay related to a communication process and to reduce time for applying the beamforming, thereby performing the beamforming based on fresh channel information. It is possible to minimize the deterioration of characteristics by the beamforming according to the fresh channel information.

In one embodiment, means for notifying the maximum dimension $M_{max}$ at the time of computing the transmission weight matrix for beamforming of the first terminal to the second terminal is not specially limited.

For example, in the EWC specification, it is defined that any HT function supported by a HT terminal is transmitted as the HT capability element, and is declared. In the HT capability element, a transmit beamforming (TxBF) capability field for describing the existence of support of any HT function for beamforming is provided. Accordingly, when the terminal operated as the beamformee performs the explicit feedback, a capability description field for describing the spatial dimension number of the sounding packet, which can be received from the beamformer, is included. A field for describing the spatial dimension number allowed to the CSI information when the beamformer performs the explicit feedback may be further defined in the capability description field.

The HT capability element may be included in a predetermined management frame. For example, when the wireless communication apparatus is operated as an access point, the HT capability field may be included in a type of transmission frame. The transmission frame may be a beacon which is notified in a frame period, a measure pilot, an association response and a re-association response which respond to the request of association from the client terminal, or a probe response which responds to the request of BBS information from the client terminal. When the wireless communication apparatus is operated as a client terminal (or a communication station other than the access point), the HT capability field may be included in a type of transmission frame of an association request and re-association request for requesting network association to the access point, and a probe request for requesting BSS information to the access point. Accordingly, even when the wireless communication apparatus is operated as either an access point or a client terminal, the wireless communication apparatus can notify the beamformee of the maximum dimension number allowed to the CSI information as the beamformer by transmitting the HT capability element.

Alternatively, it is considered that the beamformer specifies the maximum spatial dimension of the CSI information in the packet for requesting the CSI information to the beamformee. For example, the CSI/Steering field for requesting the CSI information is provided in the HT control field of the MAC frame defined in the EWC specification, and a packet transmission source can request the CSI information in the packet unit. Accordingly, a field for describing the spatial dimension number allowed to the CSI information may be further defined in the HT control field.

The beamformer may include the signal for requesting the CSI information in the sounding packet including the training sequence for exciting the channel.

In the EWC specification, a zero length frame (ZLF) (also called a null data packet (NDP), hereinafter referred to as "ZLF") dedicated to the sounding packet is defined. The ZLF includes only a PHY header part including the training sequence for exciting the channel and does not include an MAC frame. Because the ZLF does not have the MAC header, the CSI information cannot be requested by the HT control field. In such a case, the training means does not include the signal for requesting the CSI information in the sounding packet and requests the CSI information in the HT control field of a general packet previously transmitted thereto. The maximum spatial dimension number of the CSI information is specified in the general packet.

According to a second embodiment, there is provided a wireless communication system which performs data transmission using spatially multiplexed streams from a first terminal including N antennas to a second terminal including M antennas (N is an integer of 2 or more and M is an integer of 1 or more), the system including: training means for transmitting a packet including training sequence corresponding to the number N of antennas of the first terminal and the number M of antennas of the second terminal from the first terminal to the second terminal; channel matrix estimation means for dividing the training sequence received by the antennas of the second terminal into M streams and estimating an M×N channel matrix; channel information feedback means for feeding back the M×N channel matrix estimated in the second terminal to the first terminal; transmission weight matrix computation means for obtaining a transmission weight matrix for beamforming at the time of transmitting data from the first terminal to the second terminal in an N×N range of the M×N channel matrix fed back from the second terminal to the first terminal, in consideration of the number N of antennas of the first terminal; and beamforming means for performing beamforming in transmission signals of the antennas of the first terminal using the transmission weight matrix for beamforming when a data packet is transmitted from the first terminal to the second terminal.

In the wireless communication system according to the second embodiment, the beamforming performed according to the explicit feedback is different from that of the first embodiment. The primary difference is in that a procedure of notifying the second terminal of the maximum dimension $M_{max}$ for computing the transmission weight matrix for beamforming of the first terminal is omitted in the second embodiment. In this case, the second terminal estimates an M×N channel matrix and feeds back the channel matrix without any changes, and the first terminal obtains the transmission weight matrix for beamforming in an N×N range of the M×N channel matrix in consideration of the number N of its own antennas. That is, the first terminal can perform the computation of the transmission weight matrix for beamforming in the range of the processing corresponding to the number of its own antennas to reduce the circuit size of the first terminal.

In the wireless communication system according to the second embodiment, the circuit size of the buffer part for receiving the CSI information cannot be reduced, or the overhead due to the feedback of the CSI information cannot be reduced, because M×N channels are fed back, but the transmission weight matrix for beamforming is computed from the N×N channel matrix. Accordingly, the circuit size of the beamforming transmission weight matrix computation unit can be reduced to an order of $(N/M)^2$, compared with the case where the transmission weight matrix is computed from the M×N channel matrix. Due to the reduction in circuit size, it is possible to reduce power consumption of the apparatus. Due to the reduction in circuit size, it is possible to reduce delay related to a communication process and to reduce time for applying the beamforming and thus to perform the beamforming based on fresh channel information. It is possible to significantly suppress the deterioration of characteristics by the beamforming according to the fresh channel information.

According to the embodiment, there are provided a wireless communication system, a wireless communication apparatus, and a wireless communication method, which are capable of performing communication at a high transmission rate by a beamformed packet by allowing a terminal, which is operated as a beamformer to suitably set a transmission weight matrix on the basis of an estimation channel matrix fed back from a terminal, which is operated as a beamformee.

According to the embodiment, there are provided a wireless communication system, a wireless communication apparatus, and a wireless communication method, which are capable of suitably performing beamforming without increasing a processing capability of channel estimation, or a computing capability of a matrix for beamforming in the beamformer, even when the number of antennas of a terminal, which is a beamformer, is smaller than that of a beamformee.

In the wireless communication system according to the embodiment, when beamforming is performed on the basis of a backward channel estimation result by the explicit feedback, and the number of antennas of a terminal of a transmitter side is smaller than that of a terminal of a receiver side, a transmission weight matrix for beamforming in which the dimension is suppressed can be computed by previously notifying of a spatial dimension number in the terminal of the transmitter side, thereby reducing the circuit size of the terminal of the transmitter side.

According to the embodiment, in the explicit feedback, it is possible to reduce the circuit size of the apparatus operated as the beamformer, thereby reducing power consumption of the apparatus, by suppressing the dimension number of the channel matrix fed back from the beamformee, or suppressing the dimension number of the computation of the transmission weight matrix for beamforming in the beamformer.

Because the CSI information fed back from the beamformee to the beamformer is reduced from M×N to N×N, overhead is reduced, thus improving the overall throughput of the system.

Due to the reduction in circuit size and the reduction of channel overhead, it is possible to reduce delay related to a communication process and to reduce time for applying the beamforming, and thus to perform the beamforming based on fresh channel information. It is possible to minimize the deterioration of characteristics by the beamforming according to the fresh channel information.

Other features and/or advantages of the invention will become apparent and more readily appreciated from the following description of the embodiments, taken in conjunction with the accompanying drawings.

BRIEF DESCRIPTION OF DRAWINGS

FIG. 4 shows a format of a HT capability element.

FIG. 5 shows a Tx beamforming capability field.

FIG. 6 shows a HT control field of an MAC frame defined in the EWC specification.

FIG. 7 shows a CSI/steering field.

FIG. 11 is a flowchart illustrating a process when operating the wireless communication apparatuses shown in FIGS. 2 and 3 as a beamformee on the basis of the explicit feedback.

FIG. 12 illustrates a frame exchange procedure for transmitting beamforming from an access point to a client terminal by explicit feedback.

BEST MODE FOR CARRYING OUT THE INVENTION

Hereinafter, embodiments will be described in detail with reference to the accompanying drawings.

A wireless communication system according to an embodiment may perform closed loop type MIMO communication. Particularly, a transmitter terminal may perform beamforming in order to perform feedback for a channel matrix, for example, the "explicit feedback" defined in the EWC HT MAC specification. For explicit feedback, a beamformer performs beamforming on a transmission packet using a transmission weight matrix for beamforming obtained on the basis of an estimation channel matrix fed back from a beamformee, so as to establish communication.

However, a terminal has a processing capability for performing channel estimation, or a processing capability for computing a matrix for beamforming. The processing capability depends largely on the number of antennas that the terminal includes. Accordingly, if the beamformer includes a large number of antennas, the beamformer may not obtain a matrix for beamforming, because the spatial dimension number of the matrix is large even when an estimation channel matrix is fed back from the beamformee.

In the wireless communication system, according to the embodiment, when beamforming is performed according to explicit feedback, the beamformee is pre-notified of a maximum dimension $M_{max}$ for computing the transmission weight matrix for beamforming of the beamformer. The beamformee transmits the packet including a forward channel matrix information having $M_{max}$ or fewer rows and N columns in correspondence with maximum dimension $M_{max}$ of the matrix operation of the beamformer. In other words, the beamformee suppresses the dimension number of the estimation channel matrix to be less than or equal to maximum dimension $M_{max}$ and returns the CSI information. Accordingly, the beamformer can obtain the transmission weight matrix for beamforming in a range of the processing capability corresponding to the number of its own antenna.

Figure 1:
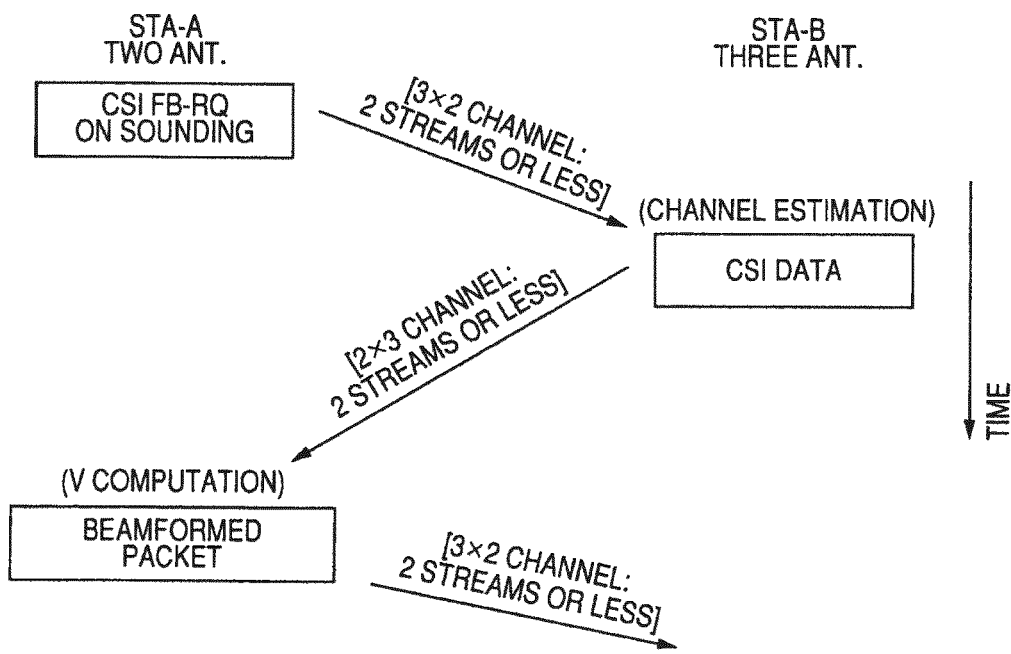
FIG. 1 is a schematic diagram illustrating an operation procedure of explicit feedback, according to an embodiment consistent with the invention.

FIG. 1 is a schematic diagram illustrating an operation procedure of explicit feedback according to an embodiment. Here, a terminal STA-A, which is operated as a beamformer, includes a first number of antennas. In this particular embodiment, the first number is two, which is equal to a maximum dimension number when computing the transmission weight matrix for beamforming. A terminal STA-B, which is operated as a beamformee, includes a second number of antennas. In this particular embodiment, the second number is three. This procedure is carried out under the basis of the EWC MAC specification.

First, terminal STA-A transmits a sounding packet including a training sequence to terminal STA-B, and performs a CSI request in explicit feedback. Terminal STA-A includes information of the maximum dimension number when computing the transmission weight matrix for beamforming in the CSI request. Terminal STA-B is pre-notified of the maximum dimension number by a separate procedure.

The sounding packet transmitted from terminal STA-A excites a 3×2 forward channel matrix. Terminal STA-B is designed to include processing capability corresponding to the number of its own streams. When the sounding packet is received, the 3×2 forward channel matrix can be generated without a problem.

Terminal STA-B suppresses the dimension number of CSI information for feeding back the generated estimation channel matrix to $M_{max} \times N$ or less in consideration of the processing capability of terminal STA-A. The feedback of CSI information is suitable when a fewer number of spatial streams is used either in the transmission capability of terminal STA-A or in a reception capability of terminal STA-B. For example, only one or two spatial streams is used.

When receiving the CSI information, terminal STA-A can compute the transmission weight matrix for beamforming in the processing capability, thereby reducing the circuit size of the terminal.

Thereafter, the request of sounding packet, the channel estimation due to the reception of sounding packet, and the computation of the transmission weight matrix for beamforming are repeatedly performed whenever terminal STA-A performs the beamforming.

Because the dimension number of the channel estimation is suppressed according to the number of antennas of terminal STA-A, the channel estimation is fed back from terminal STA-B. Terminal STA-A, which is operated as the beamformer, can obtain the transmission weight matrix for beamforming in which the dimension number is suppressed, thereby reducing the circuit size of terminal STA-A.

More specifically, in one example, if $M_{max}=N$, the circuit size of a buffer part for receiving the CSI information can be reduced to an order of $(N/M)^2$, compared with a case where an MN channel matrix is fed back (in this case, N=2 and M=3). In addition, because the transmission weight matrix for beamforming is computed from an N×N channel matrix, the circuit size of the beamforming transmission weight matrix computation unit can be reduced to an order of $(N/M)^2$, compared with the case where the transmission weight matrix is computed from the M×N channel matrix. Due to the reduction in circuit size, it is possible to reduce power consumption of the apparatus.

Because the CSI information fed back in the channel is reduced from M×N to N×N, overhead is reduced and thus the overall throughput of the system can be improved.

Due to the reduction in circuit size and the reduction in channel overhead, it is possible to reduce delay related to a communication process and to reduce time for applying the beamforming, thereby performing the beamforming based on fresh channel information. It is possible to minimize the deterioration of beamforming characteristics according to the fresh channel information.

Compared with a case where the beamforming is performed using the M×N estimation channel matrix, the characteristics may be deteriorated, but the fresh channel information can be applied for a short time due to the overhead reduction. Accordingly, the deterioration may be minimized.

In order to realize the above-described beamforming procedure, channel estimation maximum dimension $M_{max}$ of the beamformer needs to be notified to the beamformee.

For example, in the EWC specification, it is defined that any HT function supported by a HT terminal is transmitted as the HT capability element and is declared. In the HT capability element, a transmit beamforming (TxBF) capability field for describing the existence of the support of any HT function for beamforming is provided.

FIG. 4 shows a format of the HT capability element. In the TxBF capability field, HT function of the beamforming is specified. FIG. 5 shows the configuration of the Tx beamforming capability field.

Figure 14:
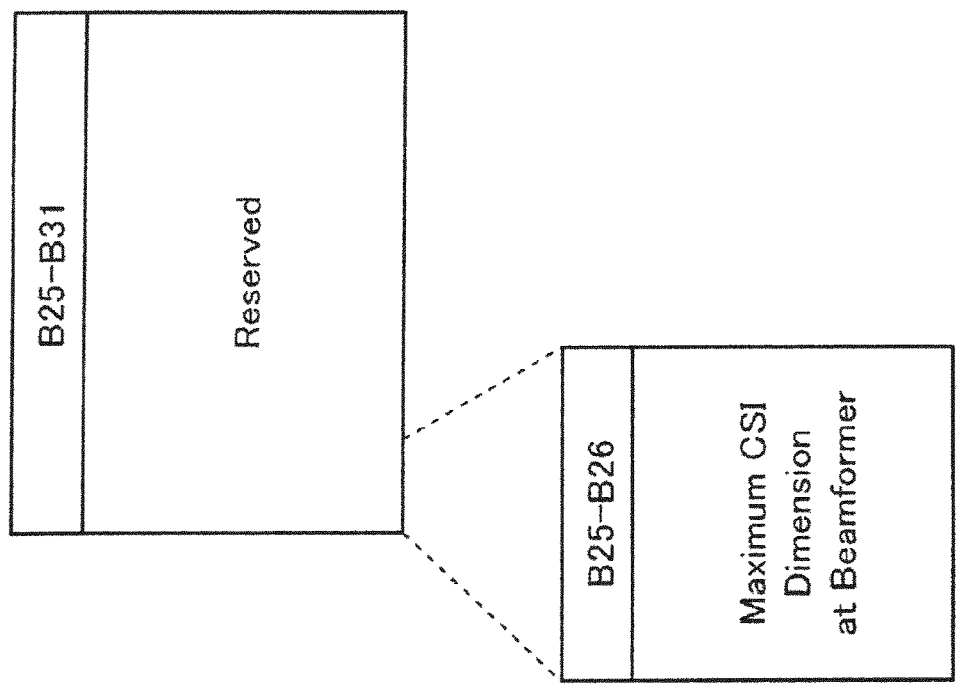
FIG. 14 is a view showing an aspect of using two bits of B25 to B26 of a Tx beamforming capability field as a "maximum CSI dimension at beamformer" field.

The Tx beamforming capability field has 32 bits, but, among them, $19^{th}$ to $20^{th}$ bits are allocated to the CSI number of beamformer antennas, $21^{st}$ to $22^{nd}$ bits are allocated to the uncompressed steering matrix of beamformer antennas, and $23^{rd}$ to $24^{th}$ bits are allocated to the compressed steering matrix of beamformer antennas. In these fields, the spatial dimension number of the sounding packet which can be received from the beamformer when the beamformee performs the explicit feedback with each format is described. A field for describing the spatial dimension number allowed to the CSI information when the beamformer performs the explicit feedback may be further defined in the field. As an additional defining method, for example, information on the maximum spatial dimension when receiving the sounding packet is described using a partial bit field of B25 to B31 which is a "reserved" area in the current Tx beamforming capability field. In particular, two bits of B25 to B26 are used as "maximum CSI dimension at beamformer" field (see FIG. 14). A matrix having one row and N columns is defined as a maximum, if the value thereof is zero; a matrix having two rows and N columns is defined as a maximum, if the value thereof is one; a matrix having three rows and N columns is defined as a maximum, if the value thereof is two; and a matrix having four rows and N columns is defined as a maximum, if the value thereof is three, thereby representing the spatial dimension number allowed to the CSI information when receiving the sounding packet.

The HT capability element may be included in a predetermined management frame. For example, when terminal STA-A is operated as the access point, the HT capability field may be included in a transmission frame. The transmission frame may be one of: the beacon, which is notified in each frame period, a measure pilot; both an association response and a re-association response, which respond to the request of association from the client terminal; and a probe response, which responds to the request of Basic Service Set (BSS) information from the client terminal, such that the dimension number of CSI information is notified to terminal STA-B, which participates in the network operated by terminal STA-A. When terminal STA-A is operated as the client terminal (or a communication station other than the access point), the HT capability field may be included in a transmission frame. The transmission frame may be one of: both an association request and re-association request for requesting network association to terminal STA-B, which is operated as the access point; and a probe request for requesting BSS information to the access point. Accordingly, even when terminal STA-A is operated as either the access point or the client terminal, terminal STA-A can notify terminal STA-B of the maximum dimension number allowed to the CSI information by transmitting the HT capability element.

The CSI dimension information described in the HT capability element transmitted from terminal STA-A is efficient in a terminal other than terminal STA-B. For example, when terminal STA-A performs implicit beamforming using the CSI feedback with respect to a terminal STA-C (not shown), the CSI dimension information is not sent again.

Alternatively, it is considered that the beamformer specifies the maximum spatial dimension of CSI information in the packet for requesting CSI information to the beamformee. FIG. 6 schematically shows a HT control field of the MAC frame defined in the EWC specification. The HTC field has 32 bits. Among them, in the CSI/steering field at the $22^{nd}$ to the $23^{rd}$ bits, a packet transmission source may request the CSI information in the packet unit. A field for describing the spatial dimension number allowed to the CSI information may be further defined in the HTC field.

Subsequently, a modified example of the operation procedure of the explicit feedback will be described with reference to FIG. 1.

First, terminal STA-A transmits a sounding packet including the training sequence to terminal STA-B, and performs a CSI request in the explicit feedback. However, terminal STA-A is not notified of the information on the maximum dimension number at the time of computing the transmission weight matrix for beamforming.

The sounding packet transmitted from terminal STA-A excites a 3×2 forward channel matrix. Terminal STA-B is designed to include processing capability corresponding to the number of its own streams. When the sounding packet is received, the 3×2 forward channel matrix can be generated without a problem.

Terminal STA-B feeds back the 3×2 channel matrix to terminal STA-A as the CSI information without change. The feedback of CSI information is suitable when a fewer number of spatial streams is used either in the transmission capability of the STA-A or in a reception capability of the STA-B. For example, only one or two spatial streams is used.

Terminal STA-A requests the transmission weight matrix for beamforming in a 2×2 range of the 3×2 channel matrix in consideration of the number of its own antennas.

Thereafter, the request of the sounding packet, the channel estimation due to the reception of the sounding packet, and the computation of the transmission weight matrix for beamforming are repeatedly performed whenever terminal STA-A performs the beamforming.

Because terminal STA-A obtains the transmission weight matrix for beamforming by the dimension number in the range of its own number of antennas, it is possible to reduce the circuit size.

In this case, terminal STA-A does not reduce the circuit size of the buffer part for receiving the CSI information or the feedback overhead of the CSI information, but computes the transmission weight matrix for beamforming from the N×N channel matrix if $M_{max}=N$ as a typical example. Accordingly, the circuit size of the beamforming transmission weight matrix computation unit can be reduced to an order of $(N/M)^2$ (in this case, N=2 and M=3), compared with the case where the transmission weight matrix is computed from the M×N channel matrix.

Due to the reduction in circuit size, it is possible to reduce power consumption of the apparatus. Due to the reduction in circuit size, it is possible to reduce delay related to a communication process and to reduce time for applying the beamforming, thereby performing the beamforming based on fresh channel information. It is possible to significantly suppress the deterioration of characteristics by the beamforming according to the fresh channel information.

In the beamforming procedure shown in FIG. 1, terminal STA-A, which is operated as the beamformer, includes the signal for requesting the CSI information in the sounding packet, the sounding packet including the training sequence for exciting the channel. In more detail, in the CSI/steering field provided in the HT control field of the MAC frame, a feedback method received from the beamformee in the explicit feedback can be specified (see FIG. 7).

In the EWC specification, a zero length frame (ZLF) dedicated to the sounding packet is defined. The ZLF includes only a PHY header part including the training sequence for exciting the channel, and does not include an MAC frame. Because the ZLF does not have the MAC header, the CSI information cannot be requested by the HT control field. In such a case, the training means does not include the signal for requesting the CSI information in the sounding packet. Instead, the training means requests the CSI information in the HT control field of a general packet transmitted prior to the sounding packet.

Figure 8A:
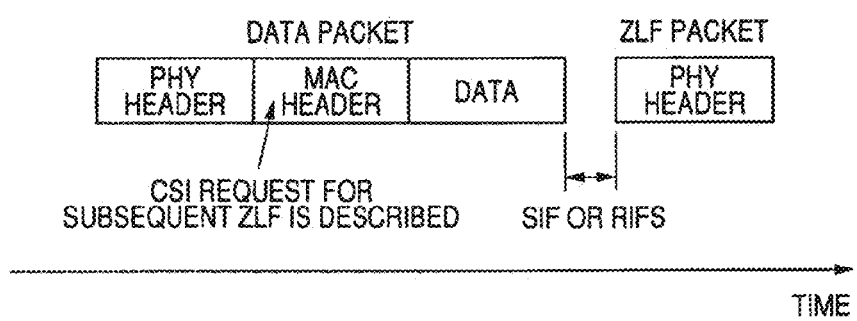
FIG. 8A shows an example of a transmission operation of a ZLF packet.

FIG. 8A shows an example of a transmission operation of the ZLF packet. As shown, the ZLF packet is transmitted when a short interframe space (SIFS) or a reduced inter frame space (RIFS) elapses after a general data packet is transmitted. In the HT control field in the MAC header included in the general data packet, the CSI request for the subsequent ZLF packet is performed by specifying the CSI/Steering field.

Figure 8B:
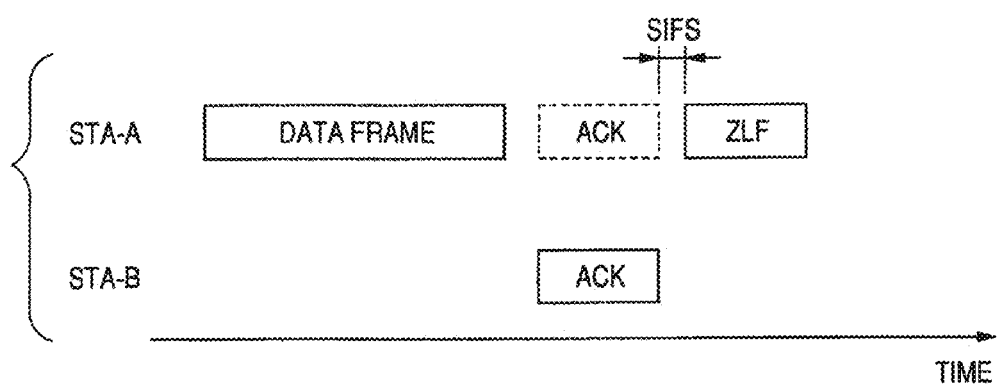
FIG. 8B shows an example of the transmission operation of the ZLF packet.

In an example shown in FIG. 8B, terminal STA-A requests the feedback of the CSI information in the data frame for requesting an immediate response, but declares that the ZLF is continuously transmitted therein. When terminal STA-B returns an ACK according to the immediate response, terminal STA-A transmits the ZLF when the SIFS elapses after the ACK is received.

Figure 2:
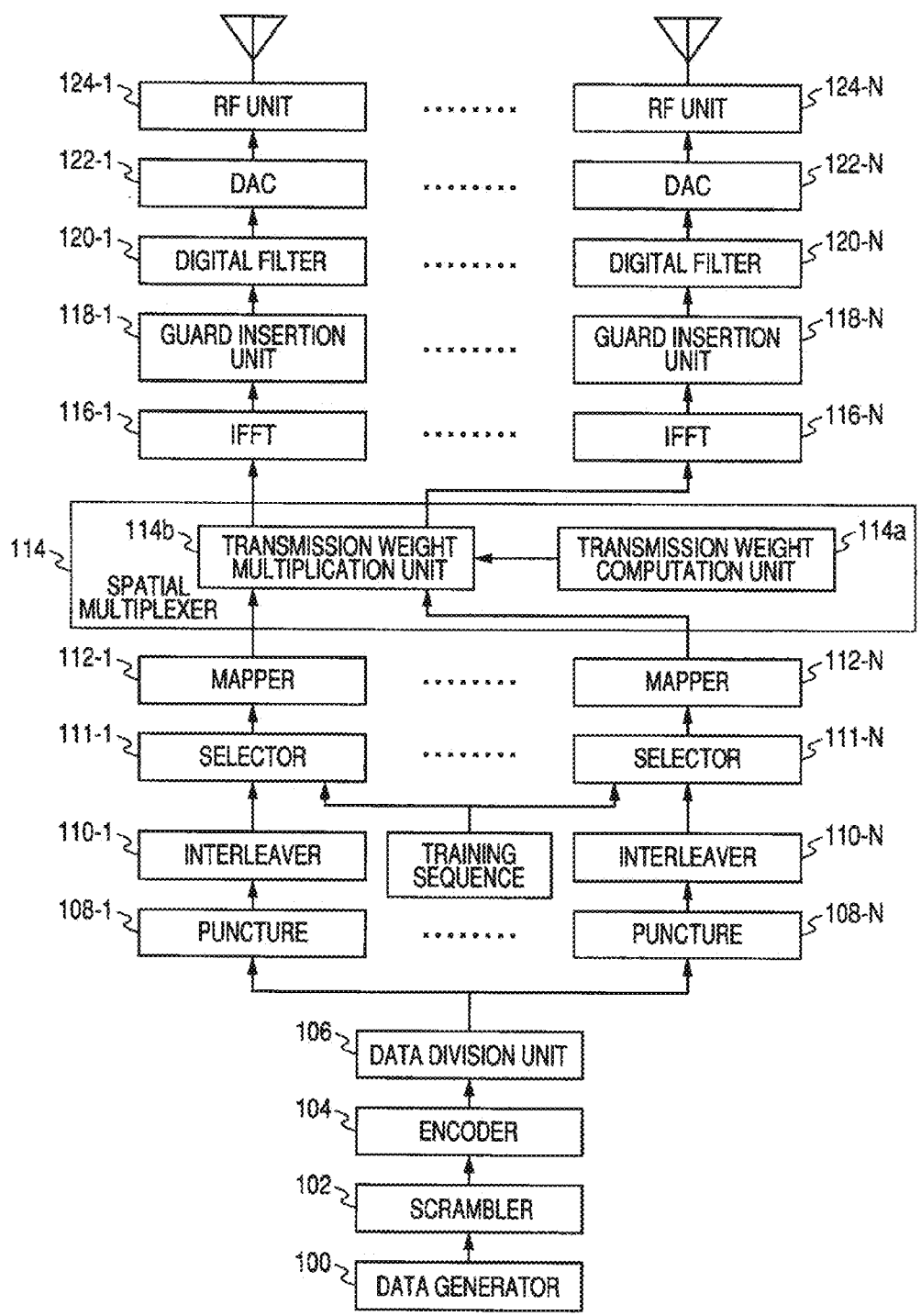
FIG. 2 illustrates a transmitter of a wireless communication apparatus, which can be operated as an STA-A (or STA-B) shown in FIG. 1.
Figure 3:
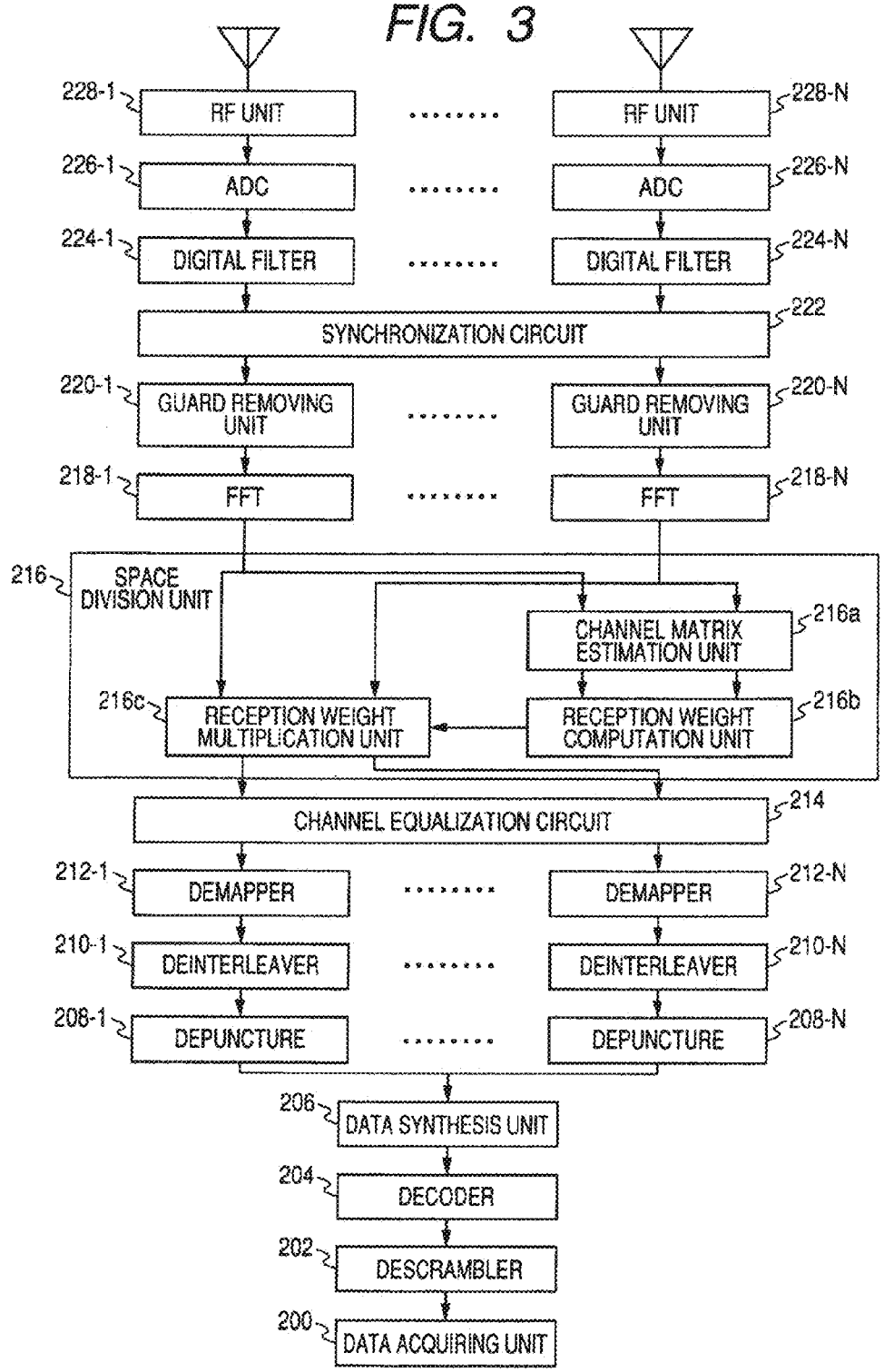
FIG. 3 illustrates a receiver of the wireless communication apparatus, which can be operated as the STA-A (or STA-B) shown in FIG. 1.

FIGS. 2 and 3 show the configurations of the transmitter and the receiver of a wireless communication apparatus, which can be operated as terminal STA-A (or terminal STA-B) in the wireless communication system shown in FIG. 1, respectively. The number of antennas of terminal STA-A is N, while the number of antennas of terminal STA-B is M. Here, N or M is at most four, for example, on the basis of the IEEE specification, but only two antennas are shown in the figures in order to avoid conflict of the figures.

Transmission data supplied to a data generator 100 is scrambled by a scrambler 102. Subsequently, error correction encoding is performed by an encoder 104. For example, in the EWC HT PHY specification, the scrambling and encoding methods are defined according to the definition of IEEE 802.11a. The encoded signal is input to a data division unit 106 to be divided into transmission streams.

In a case where the apparatus is operated as the beamformer, data generator 100 generates an MAC frame for describing the request of CSI information when performing the explicit feedback. In a case where the apparatus is operated as the beamformee, a channel matrix estimation unit 216a of the receiver constructs a data frame including the CSI information on the basis of the estimated channel matrix, in response to the reception of the CSI information request.

In each transmission stream, the transmission signal is punctured by a puncture 108 according to a data rate applied to each stream, interleaved by an interleaver 110, mapped to an IQ signal space by a mapper 112, thereby becoming a conjugate baseband signal. In the EWC HT PHY specification, an interleaving scheme expands the definition of IEEE 802.11a, such that the same interleaving is not performed among a plurality of streams. As the mapping scheme, BPSK, QPSK, 16QAM, or 64QAM is applied according to IEEE 802.11a.

A selector 111 inserts the training sequence into the transmission signal of each interleaved spatial stream at an adequate timing and supplies it to mapper 112. The training sequence includes the HT-STF (short training field) for improving the AGC in the MIMO system and the HT-LTF (long training field) for performing the channel estimation for each input signal, which is spatially modulated in the receiver.

When beamforming is performed with respect to the transmission signal, in a spatial multiplexer 114, a beamforming transmission weight matrix computation unit 114a calculates transmission weight matrix V for beamforming from channel matrix H using a computation method such as the singular value decomposition. A transmission weight matrix multiplication unit 114b multiplies the transmission vector having the transmission streams as the element by the transmission weight matrix V, thereby performing the beamforming. When transmitting the sounding packet, the beamforming is not performed with respect to the transmission signal.

When the explicit feedback using the CSI format is performed, beamforming transmission weight matrix computation unit 114a computes the transmission weight matrix using the forward channel matrix constructed based on the CSI information fed back from the beamformee. When the CSI dimension information is notified to the beamformee as the maximum dimension number computed by beamforming transmission weight matrix computation unit 114a, the CSI information returned from the beamformee is the channel information, in which the dimension number is suppressed to $M_{max} \times N$. When the CSI dimension information is not notified to the beamformee, the CSI information returned from the beamformee becomes the M×N channel matrix estimated by the beamformee. In the latter case, the beamforming transmission weight matrix computation unit 114a extracts only $M_{max}$ rows from the M×N matrix, constructs an $M_{max} \times N$ forward channel matrix, and performs the singular value decomposition with respect to the $M_{max} \times N$ forward channel matrix to obtain the transmission weight matrix V. In either case, the circuit size of the beamforming transmission weight matrix computation unit can be reduced to an order of $(M_{max}/$ M)², compared with the case where the transmission weight matrix is computed from the M×N channel matrix.

An inverse fast Fourier transform unit (IFFT) 116 converts the subcarriers arranged in a frequency domain into a time domain signal. A guard insertion unit 118 adds a guard interval. A digital filter 120 performs band limitation, a Digital-Analog converter (DAC) 122 converts the band-limited signal into an analog signal, and an RF unit 124 up-converts the analog signal to an adequate frequency band and transmits the converted signal to the channel through each transmission antenna.

Meanwhile, the data which reaches the receiver through the channel is analog-processed in an RF unit 228, converted into a digital signal by an Analog-Digital converter (ADC) 226, and input to a digital filter 224, in each reception antenna branch.

Subsequently, a synchronization circuit 222 performs processes including packet detection, timing detection, and frequency offset correction. A guard removing unit 220 removes the guard interval added to the top of the data transmission section. Fast Fourier transform unit (FFT) 218 transforms a time domain signal to a frequency domain signal.

A space division unit 216 performs a space division process of the spatially multiplexed reception signal. In particular, a channel matrix estimation unit 216a divides the spatial stream training included in the PHY header of the sounding packet and constructs an estimation channel matrix H from the training sequence.

An antenna reception weight matrix computation unit 216b computes an antenna reception weight matrix W on the basis of channel matrix H obtained by channel matrix estimation unit 216a. In a case where the beamforming is performed with respect to the reception packet and the estimation channel matrix is subjected to the singular value decomposition, the estimation channel matrix becomes equal to an UD (see Equation 3) and antenna reception weight W is calculated therefrom. A method for calculating antenna reception weight W is not limited to the singular value decomposition. Other calculation methods, such as zero forcing and MMSE, may be used. An antenna reception weight matrix multiplication unit 216c multiplies the reception vector having the reception streams as the element by antenna reception weight matrix W to perform spatial decoding of the spatial multiplexed signal, thereby obtaining independent signal sequence for each stream.

For explicit feedback, when the apparatus is operated as the beamformee, the CSI information is constructed from estimation channel matrix H obtained by channel matrix estimation unit 216a, and fed back from the transmitter to the beamformer as the transmission data. When the CSI dimension information is notified as the maximum dimension number, in which the beamformer can compute the transmission weight matrix for beamforming, the N×N channel matrix, in which the dimension number is suppressed according to the CSI dimension information, is fed back as the CSI information. When the CSI dimension information is not notified, the CSI information is constructed from M×N estimation channel matrix H obtained by channel matrix estimation unit 216a without any changes.

Figure 9:
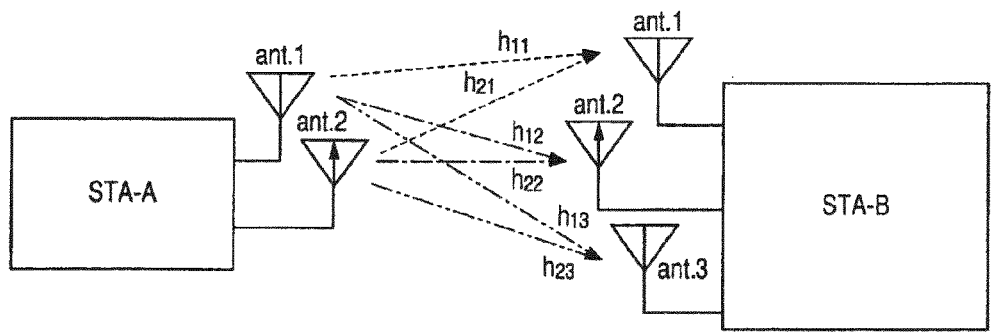
FIG. 9 illustrates a method of dividing a spatial stream training from a sounding packet transmitted from STA-A, thereby estimating a channel matrix.

For example, as shown in FIG. 9, if terminal STA-A includes two antennas (i.e. N=2), terminal STA-B includes three antennas (i.e. M=3), and the wireless communication apparatus is operated as terminal STA-B, that is, the beamformee, forward channel matrix H obtained by the channel matrix estimation unit 216a becomes a 3×2 matrix as expressed by Equation 5.

$$H_{AB} = \begin{pmatrix} h_{11} & h_{12} \\ h_{21} & h_{22} \\ h_{31} & h_{32} \end{pmatrix} \quad (5)$$

When N=2 is notified from terminal STA-A, which is operated as the beamformer, as the CSI dimension information, the CSI information is constructed using a 2×2 channel matrix formed by extracting two rows from the 3×2 channel matrix.

A channel equalization circuit 214 performs remaining frequency offset correction and channel tracking with respect to the signal sequence of each stream. A demapper 212 demaps the reception signal on the IQ signal space, a deinterleaver 210 performs deinterleaving, and a depuncture 208 performs depuncturing at a predetermined data rate.

A data synthesis unit 206 synthesizes a plurality of reception streams to one stream. This data synthesis process performs an operation, which is opposed to the data division performed in the transmitter. A decoder 204 performs error correction decoding, a descrambler 202 performs descrambling, and a data acquiring unit 200 acquires the reception data.

When the apparatus is operated as the beamformer, the CSI information acquired by data acquiring unit 200 is sent to transmission weight matrix computation unit 114a of the transmitter, when explicit feedback is performed.

In a case where the wireless communication apparatus is operated as the terminal of the data transmission in the closed loop type MIMO communication, and the beamforming is performed to initiate the transmission of the data packet or the transmission weight matrix for beamforming is desired to be updated, the sounding packet for exciting the channel matrix is transmitted to the beamformee to request the feedback of the CSI information.

The $M_{max} \times N$ or M×N channel matrix is constructed from the CSI information. In either case, because the dimension number of the channel matrix, which is suppressed to $M_{max} \times N$, M is subjected to the singular value decomposition to compute transmission weight matrix V, the circuit size of the beamforming transmission weight matrix computation unit can be reduced to an order of $(M_{max}/M)^2$, compared with the case where the transmission weight matrix is computed from the M×N channel matrix.

When the CSI dimension information is notified to the beamformee, and the $M_{max} \times N$ channel matrix is received as the CSI information, the circuit size of a buffer part for receiving the CSI information can be reduced to an order of $(M_{max}/M)^2$, compared with a case where an M×N channel matrix is fed back. Because the CSI information fed back in the channel is reduced from M×N to $M_{max} \times N$, overhead is reduced. Accordingly, the overall throughput of the system can be improved.

Due to the reduction in circuit size, it is possible to reduce power consumption of the apparatus.

Due to the reduction in circuit size and the reduction of the overhead of the channel, it is possible to reduce delay related to a communication process and to reduce time consumed for applying the beamforming. Thus, it is possible to perform the beamforming based on fresh channel information. It is possible to minimize the deterioration of characteristics by the beamforming according to the fresh channel information.

Figure 10:
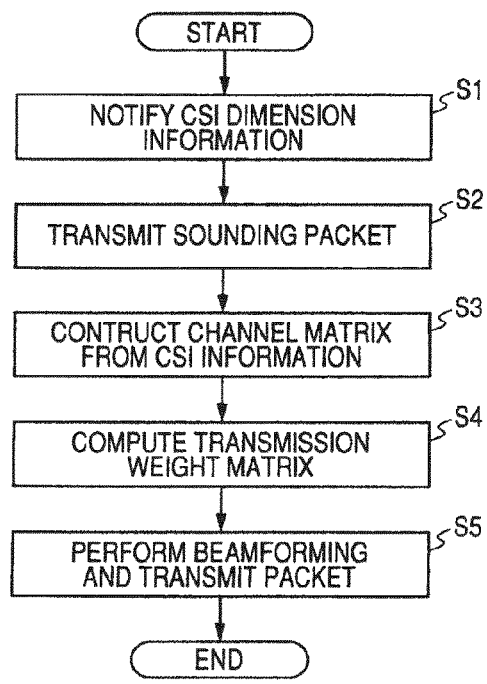
FIG. 10 is a flowchart illustrating a process when operating the wireless communication apparatuses shown in FIGS. 2 and 3 as a beamformer on the basis of the explicit feedback.
Figure 13:
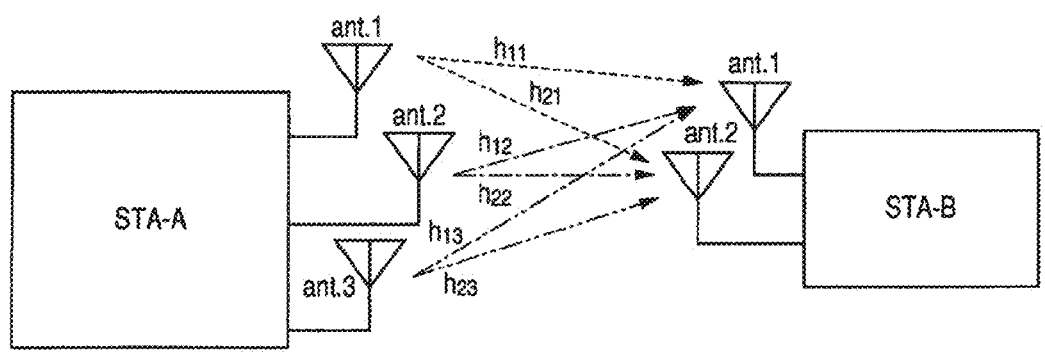
FIG. 13 is a view illustrating a calculation process for performing the beamforming according to the explicit feedback.

FIG. 10 is a flowchart illustrating a process when the wireless communication apparatus shown in FIGS. 2 and 3 are operated as the initiator, that is, the beamformer, on the basis of the explicit feedback procedure. Here, it is assumed that the beamformer includes N antennas and the beamformee includes M antennas.

First, the CSI dimension information for describing the maximum spatial dimension number at the time of the transmission weight matrix for beamforming is notified to the receiver, which is operated as the beamformee (step S1). Subsequently, the sounding packet for exciting N channels is transmitted to request the CSI information (step S2).

In order to notify the CSI dimension information, it is possible to employ a method for describing the CSI dimension information in the HT capability element defined in the EWC specification to be included in a predetermined management frame. It is also possible to employ a method for describing the CSI dimension information in the HTC field of the MAC frame of the sounding packet for requesting the CSI information. According to the former, the CSI information is notified at the time of the beacon transmission or the network association. According to the latter, step S1 and step S2 are simultaneously performed. The CSI dimension information may not be notified to the beamformee by omitting step S1.

Because the channel of N spatial dimensions is excited in the training signal part of the sounding packet and the beamformee receives the sounding packet through M antennas, it is possible to estimate the M×N channel matrix. According to the request for the CSI information, the CSI information is prepared on the basis of the estimation channel matrix and a packet having the CSI information in the data part is returned to the beamformer.

When the CSI information is received, the beamformer constructs the channel matrix (step S3), and obtains the transmission weight matrix for beamforming at the time of the forward data transmission (step S4).

The $M_{max} \times N$ or M×N channel matrix is constructed from the CSI information. In either case, because the channel matrix, in which the dimension number is suppressed to $M_{max} \times N$, is subjected to the singular value decomposition to compute transmission weight matrix V, the circuit size of the beamforming transmission weight matrix computation unit can be reduced to an order of $(M_{max}/M)^2$, compared with the case where the transmission weight matrix is computed from the M×N channel matrix. Because the CSI information fed back in the channel is reduced from M×N to $M_{max} \times N$, overhead is reduced. Accordingly, the overall throughput of the system can be improved.

The beamforming is performed in a transmission vector having the transmission signals from the antennas as the element using the transmission weight matrix for beamforming, and the data packet is transmitted to the receiver (step S5). It is possible to make an ideal spatial orthogonal channel by weighting the transmission antennas on the basis of the channel matrix and performing adequate beamforming directed to the receiver.

Due to the reduction in circuit size and the reduction in channel overhead, the beamformer can reduce delay related to a communication process and time for applying the beamforming, thereby performing beamforming based on fresh channel information. It is possible to minimum the deterioration of characteristics by the beamforming according to the fresh channel information.

FIG. 11 a flowchart illustrating a process when the wireless communication apparatus, shown in FIGS. 2 and 3, is operated as the receiver, that is, the beamformee, on the basis of the explicit feedback procedure. Here, it is assumed that the beamformer includes N antennas, and the beamformee includes M antennas.

First, the initiator operating as the beamformer receives the CSI dimension information (step S11). Subsequently, when the sounding packet is transmitted from the beamformer, the channel of N spatial dimensions is excited in the training signal part. The beamformee receives the sounding packet through the M antennas (step S12), and estimates the M×N channel matrix (step S13). The CSI information is prepared from the estimation channel matrix, and the packet including the CSI information in the data part is returned to the beamformer (step S14).

In step S11, the CSI dimension information is notified using the HT capability element defined in the EWC specification, or the field of the MAC frame of the sounding packet. Here, notification of the CSI dimension information may be omitted. When the CSI dimension information is notified, the CSI information is prepared using the channel matrix, in which the dimension number is suppressed to $M_{max} \times N$. When the CSI dimension information is not notified, the CSI information is prepared from the estimated M×N channel matrix without any changes.

The initiator obtains the transmission weight matrix for beamforming at the time of the forward data transmission using the channel matrix obtained from the CSI information. The beamforming is performed in the transmission vector having the transmission signals from the N antennas as the element using the transmission weight matrix for beamforming, and the data packet is transmitted.

The wireless communication apparatus, which is operated as the beamformee, multiplies the reception vector of the M antennas for receiving the data packet from the initiator by the reception weight matrix to perform spatial decoding of the spatial multiplexing signal, thereby obtaining the signal sequence, which are independent in each stream. By beamforming, communication can be performed at a high transmission rate even if the wireless communication apparatus is located at a place where the packet was difficult to be received in the past.

INDUSTRIAL APPLICABILITY

Although the invention will be described in detail with reference to specific embodiments, it is apparent to those skilled in the art that these embodiments may be modified or substituted without departing from the scope of the invention as claimed.

Although the MIMO communication system according to the EWC specification in IEEE 802.11n is described in the present specification, the scope of the invention is not limited thereto. As described above, the MIMO communication system transmits the spatially multiplexed streams from a first terminal including N antennas to a second terminal including M antennas. It is appreciated that the invention is applicable to various other types of communication systems, in which the beamformer performs the beamforming using the channel information fed back from the beamformee.

For simplicity, an embodiment in which the transmission terminal performs the "direct mapping" for directly mapping the streams to the antenna branches is described in the present specification. It is appreciated that the invention is also applicable to employing "spatial expansion" or a conversion method in which the streams do not one-to-one correspond to the antenna branches.

Although an embodiment is described based on IEEE 802.11n standard, which is extended from IEEE 802.11 standard, the invention is not limited thereto. The invention is applicable to a variety of wireless communication systems using an MIMO communication method, such as a mobile WiMax (Worldwide Interoperability for Microwave) based on IEEE 802.16e, IEEE 802.20 which is a high-speed wireless communication standard for a mobile object, IEEE 802.15.3c which is a high-speed wireless PAN (Personal Area Network) using 60 GHz (milliwave) band, a wireless HD (High Definition) which transmitting an uncompressed HD image using wireless transmission of 60 GHz (milliwave) band, and a fourth generation (4G) mobile telephone.

It should be understood by those skilled in the art that various modifications, combinations, sub-combinations, and alterations may occur depending on design requirements and other factors. All such modifications, combinations, sub-combinations, and alterations are considered within the scope of the appended claims, or the equivalents thereof.

The invention claimed is:

1. An electronic device for wireless communication, the electronic device comprising:
   circuitry configured to:
      receive sounding dimension information indicating a maximum value of streams corresponding to a beamformer capability, the sounding dimension information being included in a beamforming capability field defined in wireless network standard IEEE 802.11; and
      transmit signals to a receiving device based at least in part on information included in the beamforming capability field, so as to establish a wireless communication channel,
      wherein the sounding dimension information is included in the beamforming capability field adjacent to a beamformee capability,
      wherein both the sounding dimension information and the beamformee capability are for compressed beamforming.

2. The electronic device of claim 1, wherein the beamforming capability field is present in a management frame.

3. The electronic device of claim 2, wherein the management frame includes:
   a beacon signal, a measure pilot, an association response, a re-association response, and/or a probe response.

4. The electronic device of claim 1, wherein the beamforming capability field further includes both implicit beamforming capability information and explicit beamforming capability information.

5. The electronic device of claim 1, further comprising:
   a plurality of antennas configured to transmit or receive signals including channel estimation capability information.

6. The electronic device of claim 5, wherein a number of the plurality of antennas is two.

7. The electronic device of claim 5, wherein a number of the plurality of antennas is three.

8. The electronic device of claim 5, further comprising:
   a plurality of digital filters configured to perform band limitation, the number of the plurality of digital filters being equal to a number of the plurality of antennas.

9. A mobile electronic apparatus for wireless communication, the mobile electronic apparatus comprising:
   a plurality of antennas; and
   circuitry configured to:
      receive sounding dimension information indicating a maximum value of streams corresponding to a beamformer capability, the sounding dimension information being included in a beamforming capability field defined in wireless network standard IEEE 802.11; and
      transmit signals to a receiving device based at least in part on information included in the beamforming capability field, so as to establish a wireless communication channel,
      wherein the sounding dimension information is included in the beamforming capability field adjacent to a beamformee capability,
      wherein both the sounding dimension information and the beamformee capability are for compressed beamforming.

10. The mobile electronic apparatus of claim 9, wherein the mobile electronic apparatus is a mobile telephone.

11. A method for wireless communication, the method comprising:
   receiving sounding dimension information indicating a maximum value of streams corresponding to a beamformer capability, the sounding dimension information being included in a beamforming capability field defined in wireless network standard IEEE 802.11; and
   transmitting signals to a receiving device based at least in part on information included in the beamforming capability field, so as to establish a wireless communication channel,
   wherein the sounding dimension information is included in the beamforming capability field adjacent to a beamformee capability,
   wherein both the sounding dimension information and the beamformee capability are for compressed beamforming.

12. The method of claim 11, wherein the beamforming capability field is present in a management frame.

13. The method of claim 12, wherein the management frame includes:
   a beacon signal, a measure pilot, an association response, a re-association response, and/or a probe response.

14. The method of claim 11, wherein the transmit beamforming capability field further includes both implicit beamforming capability information and explicit beamforming capability information.

* * * * *